United States Patent
Menzies

[15] 3,679,924
[45] July 25, 1972

[54] SYNCHRONOUS RELUCTANCE MOTORS AND METHOD OF STARTING

[72] Inventor: Robert W. Menzies, Winnipeg, Manitoba, Canada

[73] Assignee: Canadian Patents and Development Limited, Ottawa, Ontario, Canada

[22] Filed: Jan. 19, 1971

[21] Appl. No.: 107,635

[52] U.S. Cl. ........................................... 310/163
[51] Int. Cl. ........................................... H02k 19/00
[58] Field of Search ............... 310/162, 163, 183, 197, 211, 310/212, 264, 265

[56] References Cited

UNITED STATES PATENTS

| | | | |
|---|---|---|---|
| 2,989,655 | 6/1961 | Honsinger | 310/162 |
| 2,939,025 | 5/1960 | Williford | 310/163 |
| 2,733,362 | 1/1956 | Bauer | 310/162 |
| 3,126,493 | 3/1964 | Honsinger | 310/162 |

*Primary Examiner*—J. D. Miller
*Assistant Examiner*—R. Skudy
*Attorney*—Roman J. Filipkowski

[57] ABSTRACT

Improved synchronous-running, induction-starting reluctance motors having rotors exhibiting magnetic anisotropy are designed with a large ratio of direct axis reactance $X_D$ to quadrature-axis reactance $X_q$, and low values of winding resistance $R_a$ and leakage reactance $X_a$, to obtain high efficiency synchronous-running, but the rotor eliminates most of the known damper windings and instead incorporates a vestigial cage structure limiting damping currents to diametral planes around the rotor core, and a number of parameters are drastically changed from conventional practise, to obtain a high value of asynchronous torque with a P-pole stator winding connection over the speed range $s_P = 1.0$ to about $s_P = 0.5$, but providing a rapid negative change of torque as the rotor speed approaches $s_P = 0.5$, becoming negative beyond half-synchronous speed. Very large inertial loads may be accelerated without regard to time interval with moderate starting currents during the induction-starting mode, and the motor would run indefinitely at half-synchronous speed. Reconnecting the winding to 2P-pole number enables the revolving rotor to lock on to the MMF field which is rotating substantially synchronously with it, thus converting the motor to a synchronous reluctance machine.

8 Claims, 7 Drawing Figures

Inventor:
ROBERT W. MENZIES
By:
Lawrence E. Lautrich,
ATTORNEY

PATENTED JUL 25 1972
3,679,924
SHEET 4 OF 4
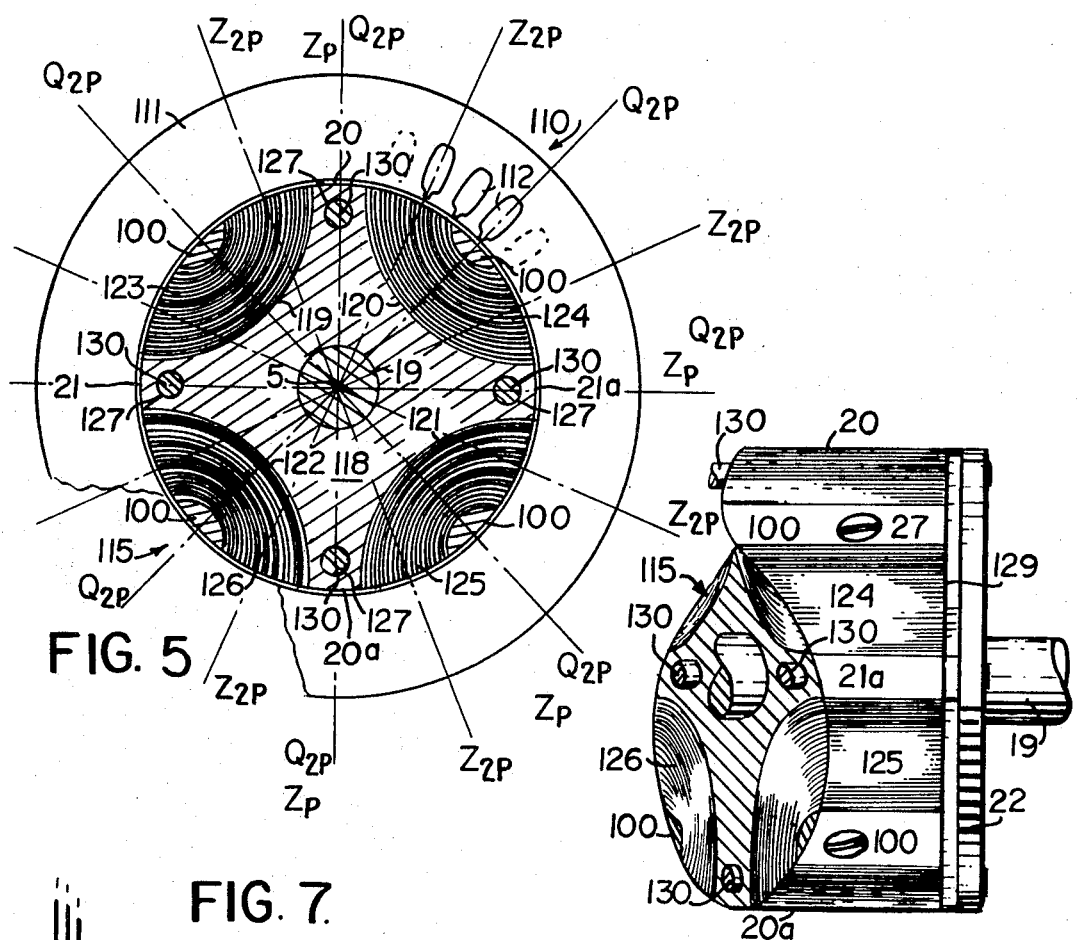
FIG. 5
FIG. 6.
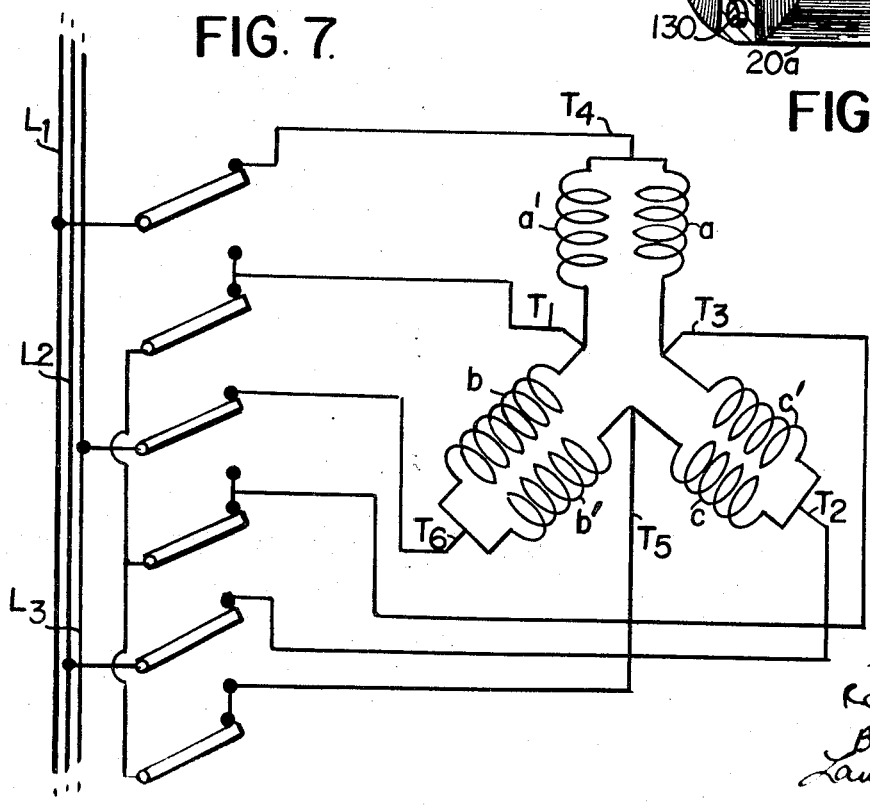
FIG. 7.
Inventor:
ROBERT W. MENZIES
By:
Lawrence E. Laubscher
Attorney

SYNCHRONOUS RELUCTANCE MOTORS AND METHOD OF STARTING

This invention relates to synchronous-running, induction-starting electric motors for use on alternating current supplies, having a single-phase or polyphase wound stator and a rotor exhibiting magnetic anisotropy and provided with damper windings, commonly known as reluctance motors.

The invention is particularly concerned to provide rOtor modifications and stator pole-changing provisions increasing many-fold the inertial loads which reluctance motors may synchronize. To invention affords the means for realizing synchronous electric motors, the reluctance rotors of which have vestigial cage damper windings and the stators of which incorporate pole-changing windings, capable of accelerating large inertial loads when energized from a constant-frequency supply with stator windings in P-pole configuration, and having a positive torque at synchronous operating speed as large as the synchronous pull-out torque with windings switched to 2P pole number.

In accordance with the teachings of this invention, synchronous single speed electric motors with reluctance rotors may be constructed with minimal compromise between their induction-starting characteristics and their synchronous-operating characteristics, in which designs a very high ratio of direct-axis magnetizing reactance $X_D$ to quadrature-axis magnetizing reactance $X_Q$ exists. For convenience, this ratio will hereinafter be referred to as the "reactance ratio". When the rotor is permeated by the stator's magnetic field, thus inducing circulating currents in its vestigial cage winding, a high starting torque is developed which is sustained over the speed range from zero to half-synchronous speed, which speed is determined by the supply frequency F (in Hertz) and the starting pole number P. As the speed tends to increase beyond half-synchronous speed, a large negative torque is developed (the Gorges phenomenon) and the motor ceases to accelerate. If, while the motor is running at very close to half-synchronous speed under steady state conditions the stator windings are switched to 2P pole number, the rotational speed of the revolving MMF field of the stator abruptly falls to half the rotational speed of such field in the stator when connected for P pole number. Inasmuch as the rotor at this moment has virtually the same angular velocity as the revolving stator MMF field, it immediately synchronizes with the field and the motor runs at the synchronous speed corresponding to:

$$R.P.M. = (120F)/(P)$$

The following table illustrates reluctance motor designs according to the invention for various speeds involving 2-pole 4-pole, 8-pole and 12-pole stator windings provided with start/run pole-changing arrangements, when operated from an AC supply of 60 Hertz.

TABLE 1

| Synchronous Speed r.p.m. | Stator Pole Number Starting | Running |
|---|---|---|
| 1800 | 2 | 4 |
| 900 | 4 | 8 |
| 600 | 6 | 12 |

In order that the practice of the invention may be more readily understood and followed, a number of practical embodiments will next be fully described with particular reference to the accompanying drawing in which, FIG. 1 is a graphical representation of torque/speed characteristics of typical prior art reluctance motors;

FIG. 5 shows a cage winding modification of the machine of FIG. 4;

FIG. 6 is a section taken along the axis of the machine of FIG. 5 showing further cage winding details; and, FIG. 7 illustrates one form of stator pole-changing switching apparatus.

Figure 1:
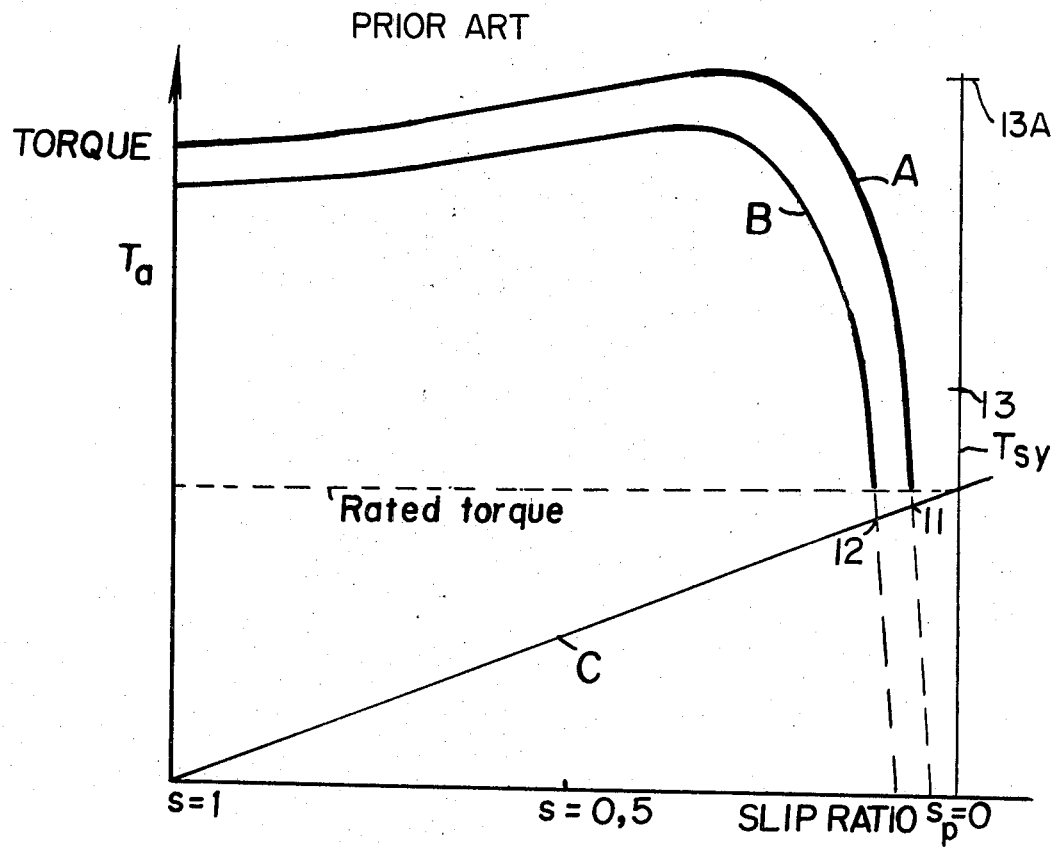

It is well known that prior art synchronous reluctance motors fail to synchronize loads of high inertia, especially when a significant workload torque must also be supplied. In prior attempts to modify reluctance motors to be capable of synchronizing combined loads, designers have enhanced the sub-synchronous torque characteristics, but at best only small inertial loads can be synchronized because the synchronous operating characteristics have unavoidably had to be sacrificed. As will be made clear in the following description with reference to FIG. 1, this approach to the problem can only result in greatly deteriorated synchronous characteristics.

The family of curves (A) and (B) depicted in the graph relate to typical designs of prior art reluctance motors. Curve (A) represents a torque/speed characteristic for a motor having a low reactance ratio:

$$(X_D)/(X_Q).$$

Such motor inherently has low synchronous torque and also low power factor, both parameters being directly dependent on this ratio, as will be explained in greater detail in the analysis to be given hereinafter. Curve (B) represents a reluctance motor design of higher reactance ratio and hence better characteristics when operating synchronously. The difference between the electromechanical asynchronous torque for either curve (A) or (B) and the associated workload torque (sloping line C) at any speed during starting, is the amount of net torque available for accelerating the rotor and its connected inertial load. These motors, on starting from rest, will accelerate their rotors and connected loads up to the intermediate speeds indicated at points 11 and 12 respectively, representing the intersections of the curves (A) and (B) with the line (C). As there is no net torque available to accelerate the rotating system beyond this intermediate speed, it would appear that synchronization could not be achieved, if it were not for a cyclically varying torque component not shown by the graph, which component will be termed the "synchronous"torque. At synchronous speed, at which the pole-slip ($s_p$) is zero, the magnitude of this component at pull-out is represented by the points 13 and 13A on the ordinate Tsy erected through the abscissa $s_p = 0$.

At any speed less than synchronous operating speed ($s_p=0$) the synchronous torque component is time-varying at a frequency related to pole-slip ($s_p$) and manifests positive and negative torque effects. At the intermediate speeds, points 11 or 12 which are relatively near to synchronous speed, so that pole-slip is small, the frequency of this component is of the order of a few cycles per second, and is related to the load angle which is a continuously-varying function. During the positive half cycle of the torque component the rotor is accelerated towards synchronous operating state, and during the negative half cycle the rotor is decelerated toward a lower asynchronous speed. If synchronous speed cannot be reached in any positive half cycle, the average running speed remains in the vicinity of the intermediate speed, 11 or 12.

Considering now the motor represented by curve (A) operating at speed 11, it synchronous torque component is small and hence if it is to succeed in accelerating the system to synchronism during a positive half cycle, the rotating system comprising the rotor and its mechanically connected load must have a small moment of inertia. Once synchronous speed is achieved, the motor will maintain this speed unless a load is applied greater than the synchronous pull-out torque, ordinate point 13.

The synchronous torque component for the motor represented by curve (B) operating at intermediate speed 12 is larger, because of the high reactance ratio of the rotor, and the pullrout torque, indicated by point 13a, is also larger. However, the speed change through which this component must accelerate the system to achieve synchronous speed is also larger, and accordingly it will be found that this motor also has a low capability of synchronizing inertial loads.

Figure 2:
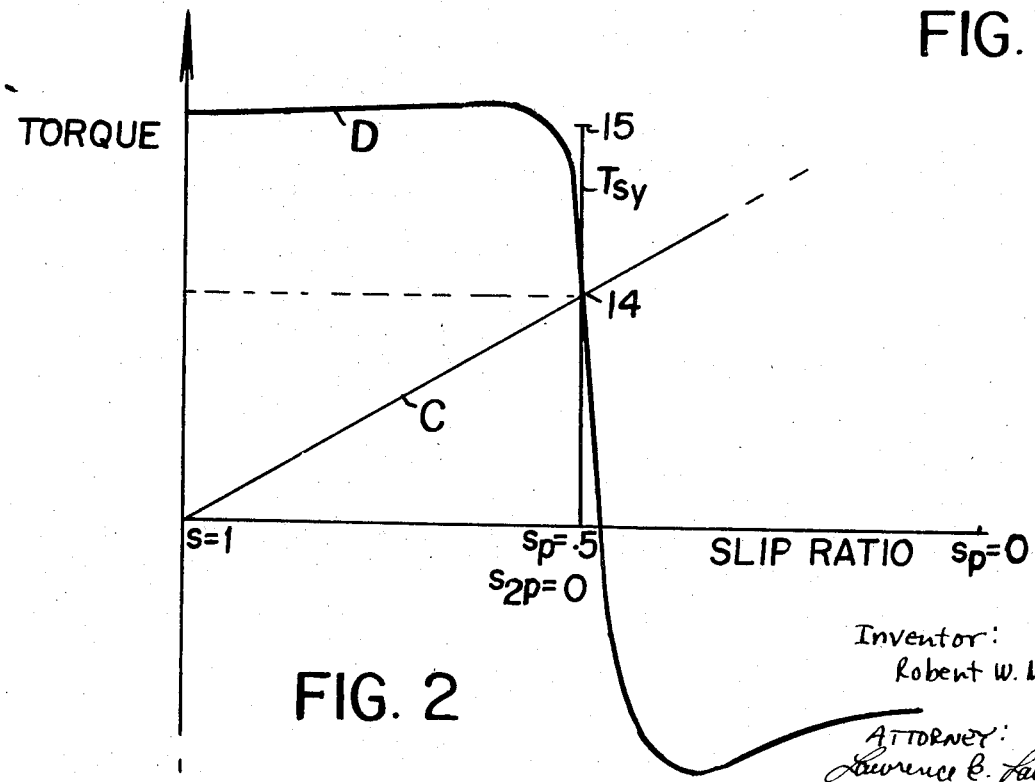
FIG. 2 is a graphical representation to the same scale of the torque/speed characteristic of a preferred design of reluctance motor according to the invention.

FIG. 2 represents the torque/speed characteristic curve (D) of a reluctance motor according to the invention, having a very large reactance ratio. In this design, the stator incorporates windings connectable for either P or 2P pole numbers, and the motor is started by switching the stator windings to the P-pole connection. The strongly accentuated inflection of the torque/speed characteristic is to be particularly noted, being indicative of a marked Gorges phenomenon deliberately achieved by modifications of the rotor design.

As was described earlier with reference to prior art reluctance motors, it is the difference between the asynchronous electromechanical torque and the load torque (C) which represents the net torque available for accelerating the motor and its connected load, and at point 14 which is very close to half-synchronous speed this torque disappears and acceleration ceases. Now if the stator windings are re-connected for 2P-pole number, synchronous torque is established and the motor is automatically synchronized without having to accelerate through a speed change. This will be apparent by considering that the synchronous torque has a pull-out value depicted by ordinate point 15, which has a relatively large value compared with the starting torque, and is comparable to the synchronous speed torque depicted by ordinate point 13A for the prior art machines.

It will be apparent that very large values of load inertia will not prevent the rotor from synchronizing, provided that the motor can supply a net torque effecting acceleration even at very low rates.

In prior art reluctance machines such as the designs of FIG. 1, the stator windings present operational impedances to the supply which vary greatly in magnitude, causing large pulses of current to flow, despite the fact that pull-in torque is only about one-seventh the synchronous torque. In contrast with this behavior the improved reluctance motors according to the invention have a stator starting current which is far below the starting currents of prior art reluctance motors.

Before proceeding with an analysis of the parameters determining the asynchronous torque/speed characteristics and their coordination in a preferred design of reluctance motors according to the invention, a brief description of prior art machines and of the improved rotors will be represented, as follows.

OPERATING PRINCIPLES OF ELECTRIC POLYPHASE RELUCTANCE MOTORS

The synchronous reluctance machine has a stator comprised of planar annular sheet steel elements, laminated axially in a manner to minimize eddy current losses, windings being carried in slots recessed into the internal surface and being energized so that at any instant the magnetizing force manifests a magnetic field having an even number of "poles" of alternate polarity uniformly spaced about the internal circumference. The MMF at any instant has a sinusoidal arcuate distribution. Such form of stator provides a rotating field when the windings are energized from an AC supply just as does the stator of a polyphase or single phase induction motor or a polyphase or single phase synchronous machine.

Whereas the rotor of an induction motor comprises an axially-extended stack of discs carrying a conductive short-circuited cage winding in slots adjacent the rotor surface, and is characterized by uniform permeability in any radial direction, the rotor of the reluctance machine is characterized by magnetic asymmetry, i.e., by widely-differing permeability in specific radial directions. Certain surface zones extending parallel with the shaft exhibit low reluctance to magnetization by stator MMF and lie in the "direct axes," while adjacent zones along the rotor surface intermediate the low reluctance zones exhibit a very high reluctance and lie in the "quadrature axes." The magnetic asymmetry is designed to create a sinusoidal flux distribution in the air gap when the poles of the rotating stator MMF are registered on the low reluctance zones of the rotor. At zero load, the rotor "locks on" the stator field and rotates synchronously with it in this relative position. With increased load, the relative position of the rotor and the rotating field changes by a small angle, developing a higher torque as the angle increases. At a certain critical load angle, i.e., when the angle between the rotor direct axis and the instantaneous stator field pole exceeds 45° (i.e., one-eighth of the arcuate distance subtended between a point on a stator pole of one polarity and the same point on the next following stator pole of the same polarity) the rotor pulls out of step and slows down.

The magnitude of the sub-synchrOnous torque developed on thefrotor of the reluctance motor depends on the resistance of the conducting material which forms closed circuits in the rotor in which current circulates due to voltage induced by the pole-slip of stator MMF. These conducting circuits have heretofore been designed to augment the asynchronous torque, i.e., a substantial cage winding has usually been resorted to in order to improve the operation as an induction motor on starting. As will be made clear by the analysis presented hereinafter, the design objective for motors to be operated according to the invention is contrary to the prior art, where a very low cage winding resistance has been sought. The direct axis rotor circuit resistance must be as high as possible in the preferred reluctance motors, i.e., closed-loop paths about the direct axes should be avoided. At the same time, the quadrature-axis rotor circuit resistance in the preferred motors should be very small, i.e., for the rotor-pole arrangement at starting, there should be provided current paths generally in planes at right angles to the quadrature axes, of low resistance, i.e., either of great cross-section, or highly conductive materials, or both.

These primary provisions, as well as certain magnetic circuit and reactance features, will be best understood by first describing preferred motor constructions embodying the design objectives, followed by a detailed mathematical analysis of motor behavior on starting.

Figure 3:
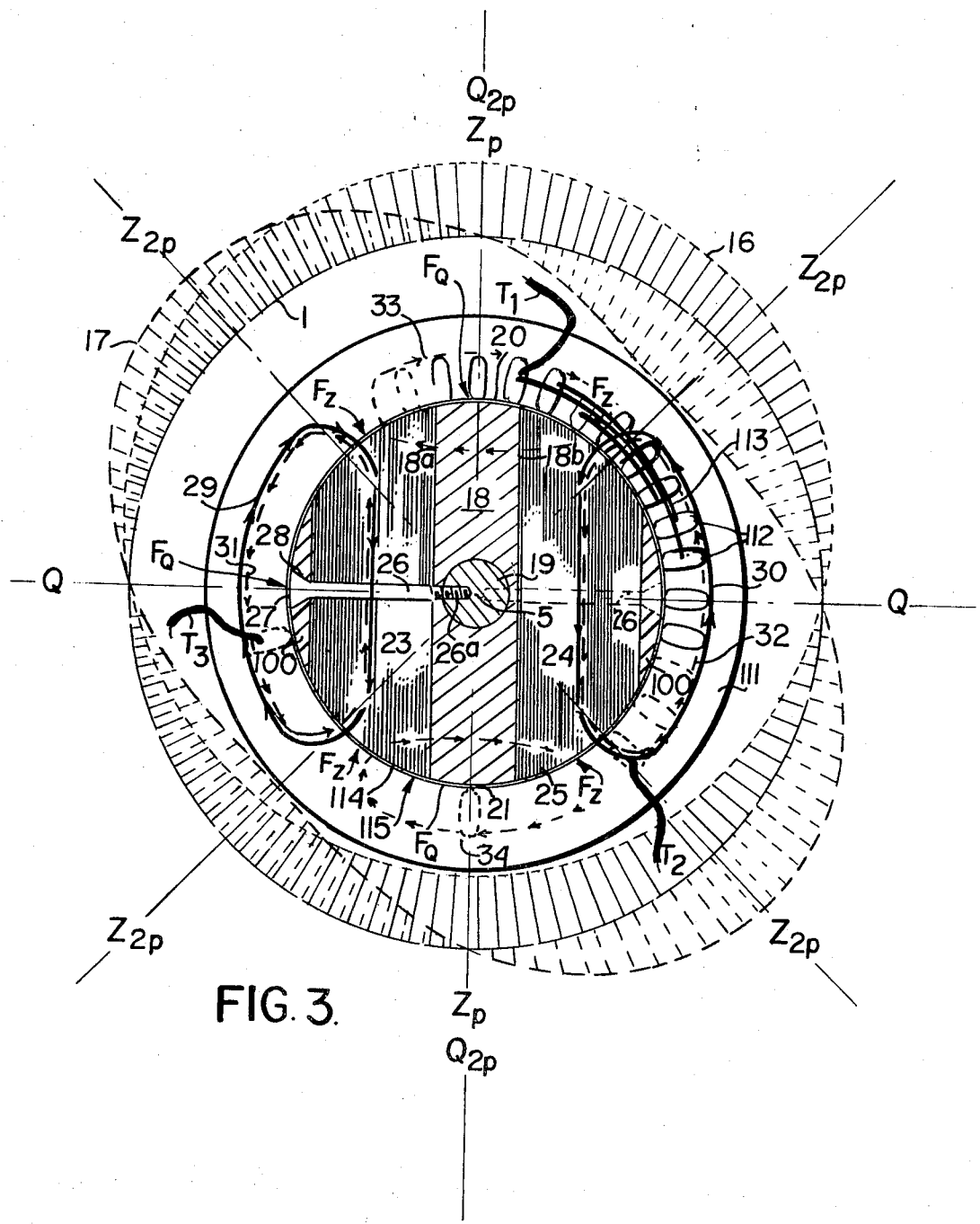
FIG. 3 is a diagram showing a transverse section of a 2-pole/4-pole wound stator illustrating flux paths with respect to the direct-axis and the quadrature-axis of a 2-segment laminated rotor.

A three-phase synchronous electric motor 110 with which the invention may be practised is shown in diametral section in FIG. 3 and comprises a conventional stacked-disc stator body 111 carrying in slots 112 recessed into its interior surface, a distributed three-phase winding, only one coil 113 of which is illustrated. The arrangement of conductors wound as coil groups is believed to be familiar to those knowledgeable in the art of induction motors and need not be elaborated here. Certain design parameters which are critically influenced by the position and kind of windings, as will become apparent from the design analysis included later in this description, will dictate the particular winding form. For example because the total winding resistance $R_a$ is required to be low in the preferred embodiments, a larger conductor size would obviously be selected by those skilled in the art. Similarly, in order to meet a preferred design objective that the winding exhibit low leakage reactance $X_a$, those persons familiar with winding practice will seek a more compact disposition of certain portions of the field coils. Specific design recommendations will be presented later.

A set of terminals $T_1$–$T_6$ is led out from the stator, whereby pole-changing switching (not shown) may be effected with respect to a three-phase alternating current supply (also not shown). The windings are so arranged as to produce at any instant a sinusoidal flux diStribution in the air gap 114 between the stator and a rotor 115 according to known winding techniques.

In the starting mode, the interconnection of the terminals $T_1$–$T_6$ will be such as to produce two field poles of opposite polarity as graphically depicted by the light dashed line 16 traced externally about the periphery of the stator, the ordinate value being in the radial direction, and tending flux denSity, relative to base circle and in the synchronous-running mode the interconnections will produce four field poles, similarly depicted and indicated by heavy dashed line 17.

Rotor 115 comprises a cylindric body having magnetic asymmetry, namely the four surfaces within sectors designated $F_Z$ present low reluctance, hence define zones of easy magnetization by the field MMF, thus manifesting four rotor poles, magnetically equivalent to salient poles, while other surfaces within sectors $F_Q$ present high reluctance, that is, define zones difficult to magnetize.

Constructions providing rotors having the characteristics mentioned are fully disclosed and claimed in my copending application Ser. No. 107,640 relating to a separate invention and filed simultaneously herewith. Only a brief description of the construction will be given here. Such rotors essentially consist of a massive central core 18 which in the FIG. 3 embodiment is a supporting bar of a non-magnetic but highly electrically conductive metal such as aluminum or its alloys, the bar haVing parallel side faces $18_A$, $18_B$ disposed equidistantly from the axis 5 of shaft 19 centered in the bar. Cylindrical surfaces 20 and 21 are radially equidistant from the axis 5 and lie in the rotor surface at gap 114. The axial length of the bar may be the same as the axial length of stack of stator 111, or it may be slightly longer. Shaft 19 may alternatively take the form of a stub-shaft mounted at one end or at both ends of the bar, by means of an end disc 22 as best seen from FIG. 6.

A pair of segmental bodies 23,24 are affixed one on each side of the support bar, and together form the bulk of the rotor body 115. Each segmental body comprises a radially stacked group of closely-nested thin flat sheets or strips such as that indicated by numeral 25 the sheets being preferably a grain-oriented steel having high unidirectional permeability. The direction of easy magnetization is aligned in the chordal direction of the rotor, i.e., perpendicular to axis 5, so that the reluctance of a path extending from one sector $F_Z$ bounding the exposed side edges of the strips of s stocked to the other sector $F_Z$ bounding the opposite side edges is extremely low, whereas the reluctance of a path in the axial direction is much higher, and the reluctance of a path intersecting the sheets at right angles is still higher.

Each stack of sheets is held in compressed condition by a retaining bar 100 extending parallel with the rotor axis and having one side formed as a cylindrical surface lying in the rotor surface. In this embodiment the peripheral dimension of the bar is such as to subtend an angle of about one radian at the axis. These retaining bars are also made of a non-magnetic metal and may have relatively high electrical resistivity, since they are deliberately excluded from forming any part of damper circuits for the rotor. Suitable fastening means such as threaded bolts 26 of non-magnetic high-strength alloy such as stainless steel are provided to secure the stack of steel sheets clamped under pressure between the bar 18 and each retaining bar 100. Preferably, the bolts pass through the steel sheets midway between their side edges and are threadedly engaged by their inner ends in suitably threaded bores $26_a$ in the shaft 19, and their conic heads 27 bear against countersunk recesses 28 in the outer face of the bar.

Considering now the MMF curve 16 representing the instantaneous field pole disposition when the revolving 2-pole stator field is momentarily aligned with the rotor poles, a field pole of one polarity, for example an "N" pole is adjacent bar surface 20, and hence develops rotor magnetization of one and the same polarity in both adjacent stack surfaces $F_Z$, while a field pole of opposite polarity, i.e., an "S" pole lies adjacent the bar surface 21, thereby developing rotor magnetization in the adjacent stack surfaces $F_Z$. It will be seen thAt each segmental body 23, 24, provides a path for half the transverse rotor flux, and that the pair of surfaces $F_Z$ respectively adjacent bar surface 20 or 21 together constitute a rotor pole, hence the rotor apparently manifest only two poles. It will also be seen that the MMF field adjacent the sectors $F_Q$ is zero or negligible. If a diametral axis Q—Q is drawn bisecting the retaining bars 100 it will lie between the rotor poles, and will hereinafter be termed the "quadrature" axis.

If the diametral axis $Z_p$—$Z_p$ is drawn at right angles to the axis Q—Q, bisecting the bar 18 along its longer dimension, it will be seen to lie in the rotor poles, i.e., centrally of and parallel with the transverse flux, and will hereinafter be termed the "direct" axis.

As a consequence of the momentary MMF pattern, certain flux linkages will exist, and closed-loop paths 29 and 30, drawn as single solid lines bearing arrows, represent the average path and the sense of magnetic induction in the respective segmental bodies 23,24. Virtually negligible flux will be set up along bar 18, while large fluxes will be aligned parallel with the chordal directions in all steel sheets, the paths being completed within the stator discs.

As the stator field revolves in a selected direction, for example clockwise about axis 5, at a rate of 60 revolutions per second for a supply frequency of 60 Hertz, the rapidly changing transverse magnetization along the width dimensions of the steel sheets when high rates of rotor slip prevail on starting will induce strong current in bar 18 and integral end ring structure 22 (see FIG. 6). As will be understood, such currents develop a high starting torque tending to accelerate the rotor and its load from rest, up to half-synchronous speed, depending on the extent to which the Gorges phenomenon is developed.

Considering further the curve 17 representing the condition when the rotor is "locked on" the rotating MMF field in the synchronous running relation, because of the re-connection of the winding which will have been effected, there are four stator poles instead of the two manifested during running-up to half-synchronous speed. Four positions of zero or negligible MMF field will be seen to be angularly spaced apart 90°, which positions are located as follows:

adjacent support bar surface 20;
adjacent right-hand retaining bar 100;
adjacent support bar surface 21;
adjacent left-hand retaining bar 100.

The four stator poles will be seen to occupy positions along a new set of direct axes $Z_{2p}$ intermediate the zero MMF field positions, and each such field pole lies adjacent a sector $F_Z$. Consequently a flux pattern prevails, different from that during running-up to half-speed, in which the flux direction in segmental body 23 becomes reversed while that in segmental body 24 remains as during starting. The four closed-loop paths 31, 32, 33 and 34 drawn as single dashed lines bearing arrows representing the average path of the flux and its direction, show that loop 32 remains identical with loop 30 in segmental body 24 while loop 31 is reversed from loop 29 in segmental body 23.

Although loops 33 and 34 are depicted as though portions of the flux paths extended transversely through bar 18, the actual paths taken within the rotor will mainly be diverted to follow paths of lower reluctance, i.e., along the chordal directions common to rotor-path portions of loops 31 and 32.

The flux set up in the rotor obviously is associated with four distinct rotor poles coextensive with the four sectoral areas $F_Z$.

It will also be evident that the total flux set up through the rotor can be very large, favoring the development of high pull-out torque, and that any angular shift of the rotor bar 18 with respect to such flux from its centered position would cause strong current to be induced in the bar, thereby generating additional torque.

Figure 4:
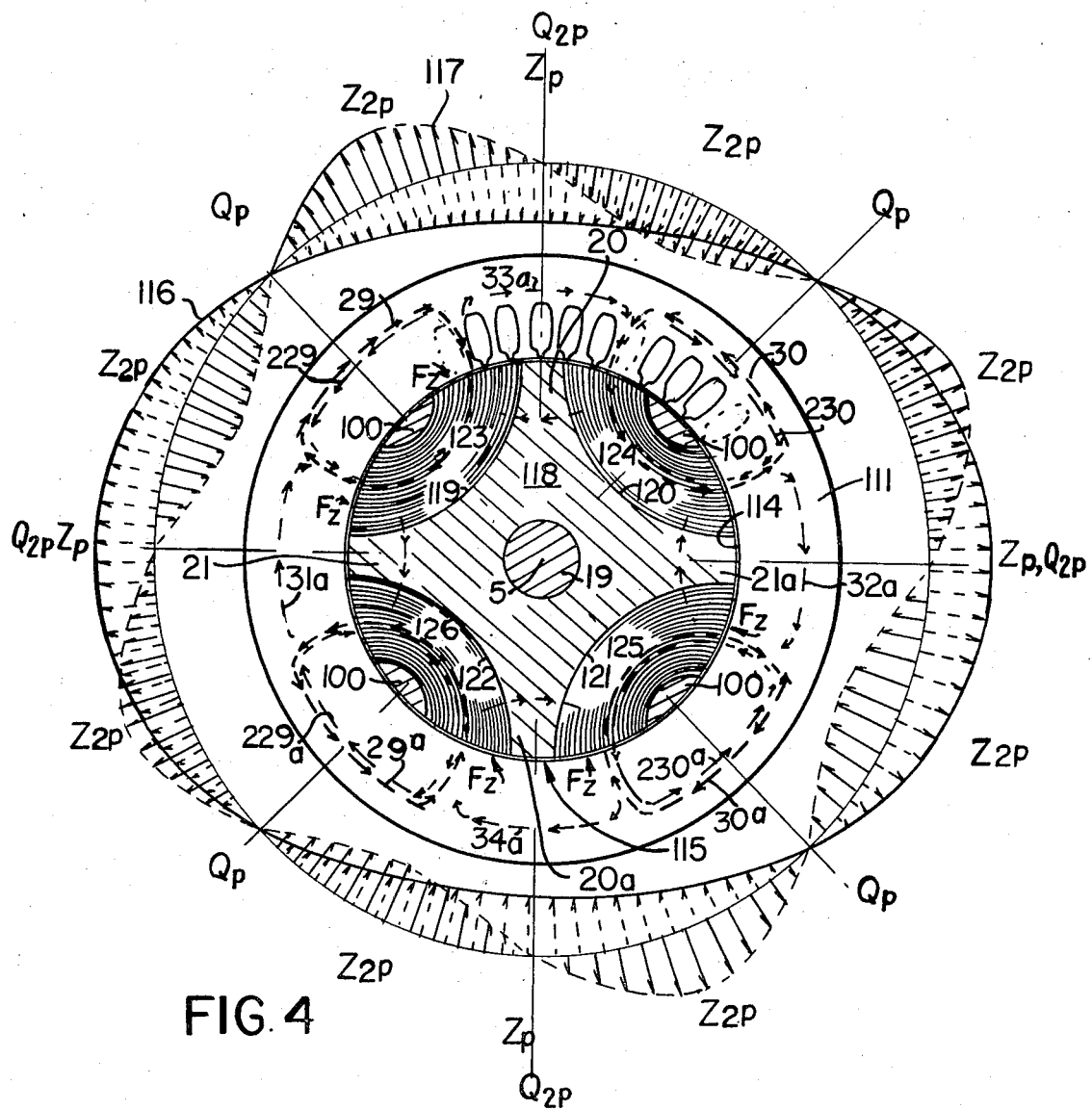
FIG. 4 is a diagram similar to FIG. 3 showing flux loops in a motor having a 4-pole/8-pole wound stator and a 4-segment laminated rotor.

An alternative embodiment of a reluctance motor suitable for use with the method of the invention, diagrammed in FIG. 4, operates at a synchronous speed half that of the embodiment of FIG. 3. It comprises a stator 111 providing eight field poles when running synchronously and four field poles at starting, including a rotor 115 carrying four radially-stocked groups of curved steel laminae as described for FIG. 3 disposed about axis 5 as segmental bodies 123, 124, 125 and 126. A massive non-magnetic but highly electrically conductive core 118 has four lobes separating concave stack-seating surfaces 119, 120, 121 and 122 in which the segmental bodies are respectively seated. These bodies provide eight cylindrical surfaces constituted by the exposed side edges of the four stacks of steel strips defining respective sectors $F_Z$, and the four intevening bars 100 clamping the stacks in the rotor structure. The MMF field in the starting mode comprises 4 poles, setting up a momentary flux distribution, the intensity of which is denoted by dashed radial ordinate arrows drawn from the base circle 1 to solid bounding curved line 116. The flux paths at starting, diagrammed for the instant when the revolving MMF field momentarily establishes zones of zero magnetization adjacent each retaining bar 100, are depicted as dashed arrow-headed lines 116 forming the loops 29, 29a, 30, and 30a. These will be seen to follow the width dimension of the strips, establishing four composite rotor poles centered on each lobe of rotor core 118.

It will be evident that the direct rotor axes $Z_p$—$Z_p$ at starting comprise two diametral lines crossing at right angles and bisecting the rotor lobes, and the quadrature axes $Q_p$—$Q_p$ constitute a set of two diametral lines also crossing each other at right angles and bisec-ting opposed pairs of retaining bars 100. The MMF field developed by the stator when connected in the synchronous-running mode comprises 8 poles setting up a momentary flux distribution, the intensity of which is denoted by solid radial ordinate arrows drawn from the base circle 1 to a dashed bounding curved line 117.

The flux paths for synchronous running, schematically depicted by arrow-headed dashed lines 229, 229a, 230 and 230a, comprise eight loops through eight stator poles and corresponding "locked on" individual rotor poles within each segmental surface $F_Z$, adjacent rotor poles lying on either side of a core lobe having opposite magnetic polarity. A new system of rotor direct axes $X_{2p}$—$X_{2p}$ is set up, shifted 45° about shaft axis $Z_p$—$Z_p$ 5 from the set of direct axes at starting, and comprising four diametral lines bisecting opposed sectors $F_Z$. Four additional quadrature axes $Q_{2p}$ are also produced shifted 45° from the starting quadrature axes, comprising two pairs of crossed diametral lines, bisecting the core lobes of the rotor.

Although portions of the flux paths are schematically drawn as loops 31a, 32a, 33a and 34a apparently setting up a substantial flux passing transversely of the rotor lobes, the high reluctance of the rotor core material would direct the flux preferentially along the width dimensions of the sheets, in parallel with flux set up by stator poles registered on both exposed surfaces of a segmental body.

Yet another embodiment of a reluctance motor providing further improvement in operation according to the method of the invention is illustrated by FIGS. 5 and 6. A modified rotor core 118 which is otherwise identical with that of FIG. 4 is provided with damper circuits, i.e., a vestigial cage structure, having still lower resistance to induced currents flowing in closed loops encircling the quadrature axes $Q_p$—$Q_p$ on starting. The lobes of the rotor core have bores 127 parallel with the axis 5 in shaft 19 and located closely adjacent the cylindrical surfaces 20, 20$_A$, 21, and 21$_A$, each bore opening into the end faces 128, 129 of the core. As will be understood by reference to FIG. 6, low-resistance copper bars 130 occupy each bore, extending at each end beyond the end faces 128, 129, and being integrally bonded as by welding into a massive low-resistance end ring 22. Such end rings may also be copper. The end faces 128, 129 of the core may be bonded to end ring 22 at each end, although such bonding may be merely a close mechanical fit or even omitted altogether.

EFFECT OF DESIGN PARAMETERS ON ASYNCHRONOUS TORQUE/SPEED CHARACTERISTICS OF SYNCHRONOUS RELUCTANCE MOTORS

The asynchronous torque-speed characteristics of preferred rotor constructions shown in FIGS. 3, 4 and 5 will be studied by examining the following well known equation evaluating the asynchronous torque $T_a$ for synchronous machines, in terms of design parameters:

$$T_a = \frac{3V_a^2 \omega^3}{2D^2} \cdot Re[\alpha^2(Y_d + Y_q) - \alpha R_a(2Y_dY_q + Y_d^2 + Y_q^2) + R_a^2(Y_d^2 \cdot Y_q + Y_q^2 \cdot Y_d)] \quad (1)$$

where:

$V_a$ is asynchronous voltage;
$\omega$ is $2\pi f$, where $f$ is supply frequency in Hertz;
$R_a$ is stator winding resistance;
$\alpha$ is $(1-2s)$, where $s$ is rotor slip expressed as fraction of synchronous speed; (2)

$$D \text{ is} - (R_a \cdot Y_d + s)(R_a \cdot Y_d + s)\omega^2 + (1-s)^2\omega^2$$
$$= \omega^2(\alpha - R_a s(Y_d + Y_q) - R_a^2 \cdot Y_d \cdot Y_q) \quad (3)$$

$$Y_d \text{ is } \frac{-j(1+js\omega T_{do}'')}{(1+js\omega T_d'')X_d} \quad (4)$$

$$Y_q \text{ is } \frac{-j(1+js\omega T_{qo}'')}{(1+js\omega T_q'')X_q} \quad (5)$$

and the time constants $T_{do}''$, $T_d''$, $T_{qo}''$ and $T_q''$ are related to the machine parameters by the following equations:

$$T_d'' = \frac{1}{\omega R_{kd}} \left(\frac{X_{md} \cdot X_a}{X_{md} + X_a} + X_{kd}\right);$$

$$T_{do}'' = \frac{1}{\omega R_{kd}} (X_{md} + X_{kd});$$

$$T_q'' = \frac{1}{\omega R_{kd}} \left(\frac{X_{mq} \cdot X_a}{X_{mq} + X_a} + X_{kq}\right)$$

and $$T_{qo}'' = \frac{1}{\omega R_{kq}} (X_{mq} + X_{kq})$$

and the machine parameters as determined at the supply frequency $f$ are defined as:

$X_a$ is stator leakage reactance;
$X_d$ is the direct axis reactance;
$X_q$ is the quadrature axis reactance;
$X_{md}$ is the rotor direct-axis magnetizing reactance;
$X_{mq}$ is the rotor quadrature-axis magnetizing reactance;
$X_{kd}$ is the rotor damper winding direct-axis leakage reactance;
$X_{kq}$ is the rotor damper winding quadrature-axis leakage reactance;
$R_a$ is the stator winding resistance;
$R_{kd}$ is the rotor damper winding direct-axis resistance;
$R_{kq}$ is the rotor damper winding quadrature-axis resistance.

The design objectives implicit in the construction of a reluctance motor having the asynchronous torque/speed characteristics shown in FIG. 2 involve two joint aims:

a. that the asynchronous torque produced in the motor when the stator winding is connected to provide P stator poles over the speed range $s_p = 1$ to $s_p = 0.5$ shOuld be approximately equal to the rated synchronous torque of the motor in the 2P pole stator connections; and, b. the torque/speed characteristic should manifest a rapid negative change of torque with speed approaching $s_p = 0.5$, i.e., the torque should become negative just beyond half-synchronous speed.

Solutions of the torque equation (1) involving all of the foregoing variables are necessarily directed toward establishing desirable design criteria, i.e., indications of relative magnitudes of those parameters most directly influencing the magnitude and speed-dependent variation of torque magnitude. Because any rigorous proof would require extremely cumbersome and lengthy computations, only a summary statement of the key criteria discovered to be primarily controlling in the attainment of the stated objectives a) and b) will be given here. The six parameters listed below should be adjusted as follows:

$R_a$ should be small;   $R_{kd}$ should be large;
$R_{kq}$ should be small;  $X_{md}$ should be large;
$X_a$ should be small;
$X_{mq}$ should be small.

The importance of a low resistance for the stator winding, $R_a$ has previously been stated. In the present state of the art the designer will be aware of obvious design choices which will yield small $R_{a1}$ as well as small $X_a$.

Referring again to FIG. 3, on starting the direct axis $Z_p$—$Z_p$ of the rotor bisects the core 18 and the flux set up in the paths 29 and 30 is maximum in response to magnetization by MMF aligned with this axis. Therefore, the parameter $X_{md}$ is large, as required.

The retaining bars 100, which in a conventional machine would form a low-resistance damper circuit encircling the rotor core 18 are not connected as a closed circuit in motors constructed for operation with the present method, and hence provide virtually infinite resistance to damping currents about the direct axis. Therefore $R_{kd}$ is large, and accords with the design criteria.

The magnetizing reactance of the rotor in the quadrature axis Q—Q on starting, i.e., in the direction transverse to the rotor core 18 and the thickness of the strips, is clearly very low because of the high reluctance of such paths; the parameter $X_{mq}$ is therefore small.

The damper winding whose resistance $R_{kq}$ requires to be minimal is formed by the rotor core 18 and end disc structure (if included) bonded thereto, constituting closed circuits of large cross-sectional area and low resistivity in a plane perpendicular to quadrature axis Q—Q. In the modification of FIGS. 5 and 6 this parameter is especially of low magnitude even though the rotor lobe thickness is less than in the FIG. 3 embodiment.

FrOm the foregoing, it will be evident that a large value of $T_a$ will be realized from the moment of starting ($s_p = 1$) until the slip factor approaches $s_p = 0.5$, when the value of ($1 - 2s_p$) passes through zero and reverses sign in denominator D of equation (1). Hence a rotor of the FIG. 3 design will be accelerated in the P-pole stator to a speed near 1,800 RPM on a supply frequency of 60 Hertz, and will run as an induction motor about that speed, until the stator winding is re-connected for 2P pole number.

Immediately upon reconnection the MMF field's rotational speed becomes virtually the same as the rotor's angular velocity, i.e., $s_{2p} = 0$, and synchronous running begins. The relevant design parameters for this mode are the direct-axis reactance $X_d$, which has been shown to be high in rotors of the reluctance motors described, and the quadrature axis reactance $X_q$, which has been shown to be of low value. Therefore the operation of the motor as a synchronous motor running at 1,800 RPM continues, with excellent efficiency due to the large reactance ratio as set out in my copending application referred to.

The criteria discussed for the motor of FIG. 3 apply equally to the 900 RPM motor of FIG. 4, and equally to still other embodiments of higher pole number. In general, in designing motors of any practical pole number the same criteria remain valid; it will be obvious that extremely slow-speed motors may be realized, and will operate also with low peak starting currents and high efficiency.

While a method of starting has been described in the foregoing particularly for synchronizing large inertial loads, it may also be practiced with prior art reluctance machines having provisions for pole-changing i.e., motors capable of being run at two speeds, provided that an adequate sub-synchronous torque is developed in the P-pole connection to enable a large inertial load to be accelerated to the 2P synchronous running speed.

Methods of pole changing are believed to be very well known and numerous circuits are described for this purpose in the literature. It will be helpful to examine briefly the schematic circuit diagram of FIG. 7 showing one possible arrangement practicable with the three-phase motors described hereinabove. The lines $L_1$, $L_2$ and $L_3$ of a 3-phase supply are connectable by way of a six-pole, two-position switch S to the set of stator-winding terminals $T_1$—$T_6$ referred to and as schematically indicated. Three pairs of phase winding are represented by letters, a, a', b, b', and c and c', the one ends of each winding of a pair being commonly connected respectively to terminals $T_4$, $T_6$ and $T_5$, while the junctions a'–b, b'–c, and c'–are led respectively to terminals $T_1$, $T_2$ and $T_3$.

The starting connection provided by switch S when in the starting mode, i.e., actuated to dispose the switch poles into their left-hand position, respectively connects lines $L_1$, $L_2$ and $L_3$ to terminals $T_4$, $T_5$ and $T_6$, forming a two-circuit star-connected winding of P poles.

After it has become evident that the motor is running as an induction motor at uniform speed close to half-synchronous speed for the 2-pole connection, switch S is actuated to dispose the switch poles into their right-hand position to effect the synchronous-running connection of lines $L_1$, $L_2$ and $L_3$ respectively to terminals $T_1$, $T_2$ and $T_3$. This disconnects terminal $T_4$, $T_5$ and $T_6$ from the supply, and establishes a single-circuit delta-connected winding of 2P poles.

Those knowledgeable in the art will recognize that there is no time limit for the duration of the starting mode, because regardless of the inertia of a coupled load, excessive starting currents are not drawn, hence the starting period may be extended as necessary for accelerating largel rotating masses. The re-connection to synchronous-running does not cause excessive currents to be drawn, since a high pull-in torque (see FIG. 2) is present the moment the re-connection is effected, and any angular shift of the rotor to register the rotor poles with the peak flux zones of the stator may readily be accomodated. It should be kept in mind that after breaking the connection with the supply when proceeding to reconnect the stator winding therewith, deceleration of the rotor may be rapid, due to connected work load; accordingly, the interval when power is not available to the motor should not be allowed to exceed that time in which slip may have become too great for the pull-in torque to lock the rotor onto the rotating MMF field. Preferably, a transfer of switch poles in a fraction of a second should be effected, to which end well-known electromechanical switch-operating devices may be advantageously employed. If the inertia of the connected load is large, no significant decrease of rotor speed is likely before about one-half second has elapsed, hence in the majority of applications manual switching would be entirely feasible. The switching action should not however be so fast that currents in the motor circuits will not yet have decayed; an interval of about 2 to 5 cycles is desirable before the supply is re-connected to avoid large transient torques and consequent mechanical shock.

I claim:

1. A pole-changing electric motor for synchronizing large inertial loads, comprising a. a stator;

b. winding means on said stator for providing a rotating set of MMF field poles of alternative pole numbers $p$ and $2p$, respectively;

c. a cylindriform rotor mounted for rotation within said stator, said rotor exhibiting magnetic anisotropy and including 1. a non-magnetic conductive core, and
2. a plurality of ferro-magnetic bodies of segmental form circumferentially spaced about and separated by said core, the number of said bodies being equal to $p$, each of said bodies providing a pair of low reluctance surfaces constituting rotor poles, the angular span of said pair of surfaces corresponding with the span of consecutive field poles in the $2p$ pole number configuration, said core having $p$ lobes bounded by the cylindrical rotor surface and providing the sole damping structure, said segmental bodies being supported on said core by non-magnetic axially extending bars in the rotor periphery electrically isolated from said damping structure. and becoming negative just above half-synchronous speed.

2. An electric motor as claimed in claim 1 wherein said core is connected with non-magnetic end discs.

3. An electric motor as claimed in claim 2 wherein said core is a slab body having an opposed pair of lobes.

4. An electric motor as claimed in claim 2 wherein said rotor has a plurality of pairs of opposed lobes and the core surface between lobes is concavely shaped to form seats for respective segmental bodies.

5. An electric motor as claimed in claim 2 wherein said bars are secured to said core by non-magnetic fastening members.

6. An electric motor as claimed in claim 2 wherein each core lobe includes an embedded bar element of high conductivity adjacent the rotor cylindric surface, said bar element being electrically connected with said core and said end discs.

7. An electric motor as claimed in claim 4 wherein each segmental body comprises a group of radially-stacked, axially-elongate nested curved sheets having high permeability along at least one dimension of the sheet.

8. An electric motor as claimed in claim 3, wherein said core supports one segmental body adjacent each flat side thereof, and each body comprises a group of radially stacked elongate flat sheets having high permeability along at least one dimension of the sheet.

* * * * *